(12) United States Patent
Gonzalez Martin et al.

(10) Patent No.: US 11,449,029 B2
(45) Date of Patent: Sep. 20, 2022

(54) CREATING A PRINT JOB USING USER-SPECIFIED BUILD MATERIAL LAYER THICKNESSES

(71) Applicant: Hewlett-Packard Development Company, L.P., Spring, TX (US)

(72) Inventors: Sergio Gonzalez Martin, Sant Cugat del Valles (ES); Leticia Rubio Castillo, Sant Cugat del Valles (ES); Jordi Roca Vila, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/734,582

(22) PCT Filed: Jan. 30, 2019

(86) PCT No.: PCT/US2019/015834
§ 371 (c)(1),
(2) Date: Dec. 3, 2020

(87) PCT Pub. No.: WO2020/159489
PCT Pub. Date: Aug. 6, 2020

(65) Prior Publication Data
US 2021/0349438 A1 Nov. 11, 2021

(51) Int. Cl.
*G05B 19/4099* (2006.01)
*B33Y 50/00* (2015.01)
(Continued)

(52) U.S. Cl.
CPC .......... *G05B 19/4099* (2013.01); *B22F 10/80* (2021.01); *B29C 64/386* (2017.08); *B33Y 50/00* (2014.12); *G05B 2219/49007* (2013.01)

(58) Field of Classification Search
CPC ...... G05B 19/4099; G05B 2219/49007; B22F 10/80; B29C 64/386; B29C 64/165;
(Continued)

(56) References Cited

U.S. PATENT DOCUMENTS

2003/0094734 A1\* 5/2003 Deckard ................. B29C 70/54
264/425
2014/0265034 A1 9/2014 Dudley
(Continued)

FOREIGN PATENT DOCUMENTS

CN 108919576 A \* 11/2018
WO WO-2017055854 A1 \* 4/2017 ........... B29C 64/393
(Continued)

*Primary Examiner* — Chad G Erdman
(74) *Attorney, Agent, or Firm* — HP Inc. Patent Department

(57) ABSTRACT

An apparatus has a processor and a machine-readable storage medium storing machine-readable instructions executable by the processor. The processor is to create a 3D print job defining a spatial arrangement of objects to be printed such that each object or each object portion is arranged in a region or regions having a build material layer thickness corresponding to a user-specified build material layer thickness and such that objects or object portions having different build material layer thicknesses are arranged in different regions. Different build material layer thicknesses may be user-specified for different objects or different object portions.

20 Claims, 9 Drawing Sheets

(51) Int. Cl.
*B29C 64/386* (2017.01)
*B22F 10/80* (2021.01)

(58) Field of Classification Search
CPC ......... B33Y 50/00; B33Y 10/00; B33Y 30/00; Y02P 10/25
See application file for complete search history.

(56) References Cited

U.S. PATENT DOCUMENTS

| | | |
|---|---|---|
| 2015/0183161 A1 | 7/2015 | Molinari et al. |
| 2015/0352790 A1* | 12/2015 | Hadas ................... B29C 64/118 700/119 |
| 2016/0008886 A1 | 1/2016 | Peterson |
| 2016/0375492 A1 | 12/2016 | Bencher et al. |
| 2018/0001550 A1 | 1/2018 | Zhao et al. |
| 2018/0015662 A1 | 1/2018 | Ermoshkin et al. |
| 2018/0281112 A1* | 10/2018 | Roerig ............... B23K 26/0604 |
| 2020/0324482 A1* | 10/2020 | Taig ..................... B29C 64/386 |

FOREIGN PATENT DOCUMENTS

| | | |
|---|---|---|
| WO | WO-WO2017193013 A1 | 11/2017 |
| WO | WO-WO2018160807 A1 | 9/2018 |
| WO | WO-WO2018199943 A1 | 11/2018 |

\* cited by examiner

```
<hpmjfl:Material xmlns:hpmjfl = "http://www.hp.com/schemas/hpmjfl/v1_2" xmlns:xsi = "http://www.w3.org/2001/XMLSchema-instance" xsi:schemal
  <hpmjfl:Version>1.2.0.0</hpmjfl:Version>
  <hpmjfl:Date>2018-07-20T18:49:56Z</hpmjfl:Date>
  <hpmjfl:ID>1000</hpmjfl:ID>
  <hpmjfl:DonorID/>
  <hpmjfl:Revision>1.0.1</hpmjfl:Revision>
  <hpmjfl:Name hasStringResource = "true">MaterialHP3DHRPA12</hpmjfl:Name>
  <hpmjfl:Category>
  <hpmjfl:PrintProfiles>
    <hpmjfl:PrintProfile>
      <hpmjfl:ID>1000.0.1</hpmjfl:ID>
      <hpmjfl:Name hasStringResource = "true">PrintProfileFast</hpmjfl:Name>     510
      <hpmjfl:Visible>true</hpmjfl:Visible>
      <hpmjfl:Clonable>true</hpmjfl:Clonable>
      <hpmjfl:Default>false</hpmjfl:Default>
      <hpmjfl:ProfileParameters>
        <hpmjfl:ProfileParameter>
        <hpmjfl:ProfileParameter>
          <hpmjfl:Name hasStringResource = "true">ProfileParameterSLICETHICKNESS</hpmjfl:Name>
          <hpmjfl:Current>
            <hpmjfl:Value>80</hpmjfl:Value>     530
            <hpmjfl:Units>micron</hpmjfl:Units>
          </hpmjfl:Current>
          <hpmjfl:Visible>false</hpmjfl:Visible>
          <hpmjfl:ReadOnly>true</hpmjfl:ReadOnly>
        </hpmjfl:ProfileParameter>
      </hpmjfl:ProfileParameters>
    </hpmjfl:PrintProfile>
    <hpmjfl:PrintProfile>
      <hpmjfl:ID>1000.0.0</hpmjfl:ID>
      <hpmjfl:Name hasStringResource = "true">PrintProfileBalanced</hpmjfl:Name>     520
      <hpmjfl:Visible>true</hpmjfl:Visible>
      <hpmjfl:Clonable>true</hpmjfl:Clonable>
```

FIG 5A

```
<hpmjfl:Default>true</hpmjfl:Default>
<hpmjfl:ProfileParameters>
  <hpmjfl:ProfileParameter>
  <hpmjfl:ProfileParameter>
    <hpmjfl:Name hasStringResource="true">ProfileParameterSLICETHICKNESS</hpmjfl:Name>
    <hpmjfl:Current>
      <hpmjfl:Value>80</hpmjfl:Value>                    540
      <hpmjfl:Units>micron</hpmjfl:Units>
    </hpmjfl:Current>
    <hpmjfl:Visible>false</hpmjfl:Visible>
    <hpmjfl:ReadOnly>true</hpmjfl:ReadOnly>
  </hpmjfl:ProfileParameter>
  <hpmjfl:ProfileParameter>
    <hpmjfl:Name hasStringResource="true">ProfileParameterMINSLICETHICKNESS</hpmjfl:Name>
    <hpmjfl:Current>
      <hpmjfl:Value>70</hpmjfl:Value>                    550
      <hpmjfl:Units>micron</hpmjfl:Units>
    </hpmjfl:Current>
    <hpmjfl:Visible>false</hpmjfl:Visible>
    <hpmjfl:ReadOnly>true</hpmjfl:ReadOnly>
  </hpmjfl:ProfileParameter>
  <hpmjfl:ProfileParameter>
    <hpmjfl:Name hasStringResource="true">ProfileParameterMAXSLICETHICKNESS</hpmjfl:Name>
    <hpmjfl:Current>
      <hpmjfl:Value>120</hpmjfl:Value>                   560
      <hpmjfl:Units>micron</hpmjfl:Units>
    </hpmjfl:Current>
    <hpmjfl:Visible>false</hpmjfl:Visible>
    <hpmjfl:ReadOnly>true</hpmjfl:ReadOnly>
  </hpmjfl:ProfileParameter>
</hpmjfl:ProfileParameters>
</hpmjfl:PrintProfile>
</hpmjfl:PrintProfiles>
<hpmjfl:CoolingProfiles>
```

FIG 5B

```xml
<?xml version="1.0" encoding="UTF-8"?>
<model unit="millimeter" xml:lang="en-US" xmlns:m="http://schemas.microsoft.com/3dmanufacturing/material/2015/02"
xmlns="http://schemas.microsoft.com/3dmanufacturing/core/2015/02"
xmlns:hpmjf="http://schemas.hp.com/3D/MJF/Metadata">
    <metadata name="CreationDate">2018-08-02</metadata>
    <metadata name="Designer">Sergio Gonzalez</metadata>
    <metadata name="Copyright">HP Inc</metadata>
    <metadata name="Title">Chess Set</metadata>
    <metadata name="ChangeHistory">2018-08-02 Initial model</metadata>
    <metadata name="ModificationDate">2018-08-02</metadata>
    <metadata name="LicenseTerms">All rights reserved</metadata>
    <metadata name="Description">Chess Set</metadata>
    <metadata name="hpmfj:SliceThickness">70</metadata>
    <metadata name="hpmfj:SliceThicknessUnit">microns</metadata>
<resources>
    <object id="2" type="model">
```

```xml
<?xml version="1.0" encoding="UTF-8" ?>
<hpmjfi:JobTicket xmlns:hpmjfi="http://www.hp.com/schemas.hpmjfi/v1_0" xmlns="http://www.w3.org/2001/XMLSchema-instance"
xsi:schemaLocation="http://www.hp.
    <hpmjfi:BuildPackageCount>5</hpmjfi:BuildPackageCount>  710
    <hpmjfi:FwReleaseDate>2018-07-31T18:20:00Z</hpmjfi:FwReleaseDate>
    <hpmjfi:FwReleaseName>CRAITCRAIT_02_18_24.10</hpmjfi:FwReleaseName>
    <hpmjfi:ModelName>HP Jet Fusion 3D 4210 Printer</hpmjfi:ModelName>
    <hpmjfi:Name>mm</hpmjfi:Name>
    <hpmjfi:SerialNumber>XXXXXXXX</hpmjfi:SerialNumber>
    <hpmjfi:SourceApplication>HP SmartStream 3D Build Manager 2.0</hpmjfi:SourceApplication>
    <hpmjfi:SourceHost>15.87.215.179</hpmjfi:SourceHost>
    <hpmjfi:UserID>sergigon</hpmjfi:UserID>
    <hpmjfi:Version>1.2.0.0</hpmjfi:Version>
    <hpmjfi:Material>
        <hpmjfi:ID>1000</hpmjfi:ID>
        <hpmjfi:Name hasStringResource="true">MaterialHP3DHRPA12</hpmjfi:Name>
    </hpmjfi:Material>
    <hpmjfi:PrintProfile>
        <hpmjfi:Clonable>true</hpmjfi:Clonable>
        <hpmjfi:Default>true</hpmjfi:Default>
        <hpmjfi:ID>1000.0.0</hpmjfi:ID>
        <hpmjfi:Name hasStringResource="true">PrintProfileBalanced</hpmjfi:Name>
        <hpmjfi:ProfileParameters>
            <hpmjfi:ProfileParameter>
                <hpmjfi:Current>
                    <hpmjfi:Units>float</hpmjfi:Units>
                    <hpmjfi:Value>1.0352</hpmjfi:Value>
                </hpmjfi:Current>
                <hpmjfi:Name hasStringResource="true">ProfileParameterAPPTHERMALCOMPENSATIONX</hpmjfi:Name>
```

Fig. 7

CREATING A PRINT JOB USING USER-SPECIFIED BUILD MATERIAL LAYER THICKNESSES

BACKGROUND 3D printing systems may print 2D layers of a predetermined build material thickness on top of each other to form 3D objects.

BRIEF DESCRIPTION OF THE DRAWINGS

Examples will now be described, by way of non-limiting examples, with reference to the accompanying drawings, in which:

FIG. 5 is an illustration of code relating to examples of printing profiles;

FIG. 6 is an illustration of code relating to an example of a build package file;

FIG. 7 is an illustration of code relating to an example of a job ticket;

Figure 1:
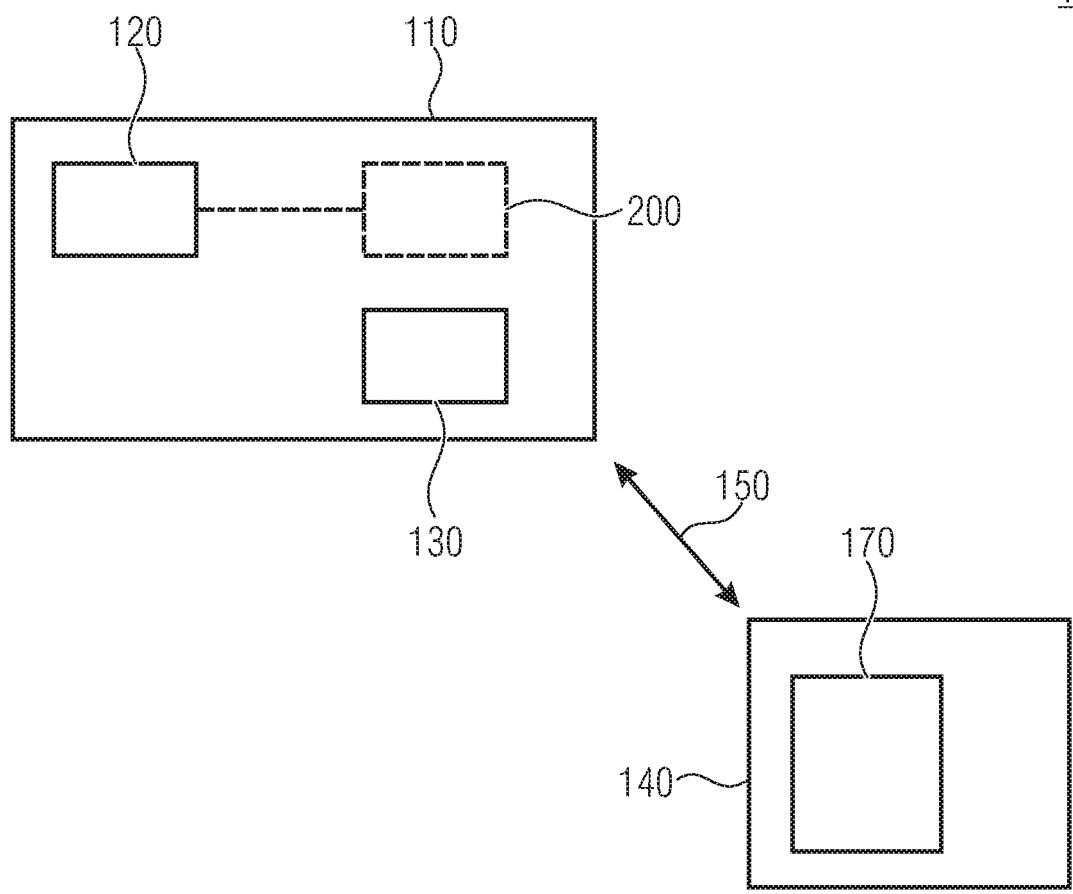
FIG. 1 is a simplified illustration of a 3D printing system including an apparatus according to an example.

DETAILED DESCRIPTION 3D printing systems, such as those known under the trademark "HP Multi Jet Fusion", include a print engine to produce 3D objects in a space above a xy-plane, wherein this space may be called build bed or build volume. The print engine receives a print job including data and information that permit the print engine to print the objects in a given spatial arrangement in the build volume. In order to produce 3D objects, layers of a given thickness are formed on top of each other in the build volume. The thickness may be defined in a printing profile and may be uniform for a print job. A user may select a specific printing profile and, thereby, a specific thickness with which the layers are to be printed. The layers may be called 2D layers since the thickness or height thereof is low when compared to the other dimensions of the layers, i.e., the length and the width thereof.

For every layer, a uniform layer of powder is formed in the build volume, and portions of each layer may be selectively solidified using an appropriate 3D printing technique. In examples, agent fluids may be placed at those points or parts of the layer, which are to be melted to form the object to be printed. In examples, a laser beam may be used to selectively melt portions of each formed layer. The layers are parallel to the xy-plane which is parallel to the floor of the build bed and are stacked in a z-direction or thickness direction, which is perpendicular to the xy-plane. Objects to be printed may be placed anywhere in the build volume. The layers of powder may have a unique height or layer thickness for a whole printing process. Upon finishing the printing process, the printed 3D object or 3D objects and the non-fused portions of the layers may be removed from the build volume. Thereupon, a new printing process may start, may be with a different layer thickness by selecting a different printing profile.

To enable objects formed from layers of different thicknesses to be printed in a single print job examples described herein spatially arrange the objects in a build volume such that such objects are to be built in the same set of build material layers. According to examples described herein the build volume may be divided into a plurality of regions or ranges in the thickness direction, each region having associated therewith a specific build material layer thickness. Each region corresponds to a set of whole layers of build material, i.e. continuous layers in the xy-plane. Different regions may have associated therewith different build material layer thicknesses. Each region of the build volume may comprise one build material layer or a plurality of build material layers of the same build material layer thickness. In examples, some or all objects or object portions may have associated therewith data defining a desired build material layer thickness. In examples, a user may select a print mode that may define a build material thickness. In examples, selecting a thin layer thickness may result in a higher definition object but may take longer to generate than if a thicker layer was selected. An object for which a thicker layer was selected would consequently have a lower definition in the z-axis direction. Accordingly, the layer thickness may vary within a printing process. Examples of the present disclosure provide an approach of creating and submitting print jobs with a variable layer thickness to allow printing using printing profiles with variable layer thickness. Accordingly, examples of the present disclosure allow objects having a high definition in the z-axis direction and objects having a low definition in the z-axis direction to be built in the same build chamber during the same build job.

The term object refers to a 3D object which is to be printed. The term object portion refers to a portion of a 3D object which is to be printed. An object may be formed by a plurality of portions. In printing, the objects are produced in the actual build volume of the print engine. The term virtual build volume is used herein to refer to the volume in which the objects to be printed are arranged virtually before the objects are actually printed in the real build volume of the 3D print engine. The term build material layer thickness describes the thickness of each layer in the z direction, which is uniform over the whole xy-plane.

According to examples of the present disclosure, a user may specify different layer thicknesses for different objects or object portions to be printed during a single printing process, such that objects or object portions having different layer thicknesses may be combined in a print job and may be arranged in the same build volume during the same build process. In other words, objects or object portions with different layer thicknesses may be printed in a single printing process when executing a single print job. Using layers with a higher thickness, e.g. 120 μm instead of a default thickness of 80 μm, for printing an object or object portion permits the time to print the object or object portion to be reduced. On the other hand, using a lower layer thickness, such as a reduced thickness of 70 μm, to print an object or an object portion permits the surface finish, i.e., the quality of the object or object portion to be increased. Examples of the present disclosure permit combining such effects in a single printing process by permitting a user to specify different build material thicknesses for different objects or object portions in the same print job.

Examples of the present disclosure provide an apparatus to create a 3D print job. The 3D print job includes data provided to a print engine in order to print objects defined in the 3D print job. The 3D print job includes data defining the objects to be printed, the associated build material layer thicknesses, and the spatial arrangement of the objects. The 3D print job may be in the form of a data file or a number of data files. The 3D print job may be submitted to the print engine and may cause the print engine to print objects in a spatial arrangement and with build material layer thicknesses specified by a user. The apparatus may be separate from a 3D printer or may be part of a 3D printer. The apparatus comprises a processor and a machine-readable storage medium storing machine-readable instructions executable by the processor. The instructions cause the processor to create a 3D print job defining objects to be printed such that each object or each object portion is arranged in a region or regions having a build material layer thickness corresponding to the user-specified build material layer thickness and such that objects or object portions having different build material layer thicknesses are arranged at different regions. Different build material layer thicknesses may be specified for different objects or different object portions. The machine-readable instructions may comprise instructions to cause the processor to present a user interface to permit a user to specify for objects or object portions to be printed associated build material layer thicknesses, wherein different build material layer thicknesses may be specified for different objects or different object portions. The user may define which object or which object portion is to be produced with which build material layer thickness. In examples, the spatial arrangement of the objects to be printed may be made automatically by the processor. In other examples, the spatial arrangement may by achieved using a user's input by which the objects are arranged on the user interface. Thus, objects or object portions having layers of different thicknesses may be arranged in the build volume at the same time, i.e. printed during the same printing process, and, therefore, expenditure of time involved in performing printing of such objects during different print processes may be saved.

Referring now to FIG. 1, there is shown a simplified illustration of a 3D printing system 100 according to an example. The 3D printing system 100 comprises a 3D printer 140 and an apparatus 110 to create a 3D print job according to the present disclosure. The apparatus 110 comprises a processor 120 and a storage medium 130 storing the machine readable instructions disclosed herein. The machine readable instructions may comprise a pre-print application permitting a user to support creation of a 3D print job. Apparatus 110 may comprise or may be communicatively connected with an interface 200. The interface may be a display combined with a touchscreen. Apparatus 110 may be in the form of a computer, such as a personal computer, a desk-top computer, a laptop, a tablet or a personal digital assistant. Interface 200 may comprise any suitable interface permitting user input and may comprise a display, a keyboard, a computer mouse, a trackball and/or a touchscreen. In examples, apparatus 110 may be part of a web-based printing system, in which a user may communicate with the apparatus 110 via a web service. Processor 120 may present the user interface as described herein on interface 200. Apparatus 110 may be communicatively coupled with 3D printer 140 as indicated by a connection 150. The communication between apparatus 110 and printer 140 may be bidirectional. Connection 150 may be wired or wireless. Apparatus 110 may be to send the print job created according to the present disclosure to the printer 140 via connection 150. The print job may be sent in the form of a print job ticket and a plurality of build package files. The print job includes the data and information permitting printer 140 to print the objects with the user specified build material layer thicknesses and the defined spatial arrangement. To this end, printer 140 comprises a print engine 170. Print engine 170 comprises the hardware to process the 3D print job, i.e. to generate the real 3D objects based on the 3D print job.

Upon sending the print job to the 3D printer 140, the objects are printed during execution of one and the same print job. Stated differently, the objects or portions having variable build material layer thicknesses are printed during the same printing or build process so that the same are arranged concurrently in the build volume. Portions or objects with increased and/or decreased print quality may be printed by executing the same print job. The print quality may be increased where desired. Furthermore, printing time may be reduced by printing objects or object portions which the user allows to be printed with reduced quality with an increased build material layer thickness.

The 3D printer 140 is to perform the print job and comprises the print engine 170 including components to build the objects or object portions having variable build material layer thicknesses specified by a user. The 3D printer 140 receives the print job from the apparatus 110 and prints the objects or object portions according to the arrangement of the objects or object portions having variable build material thicknesses as defined in the print job.

Figure 2:
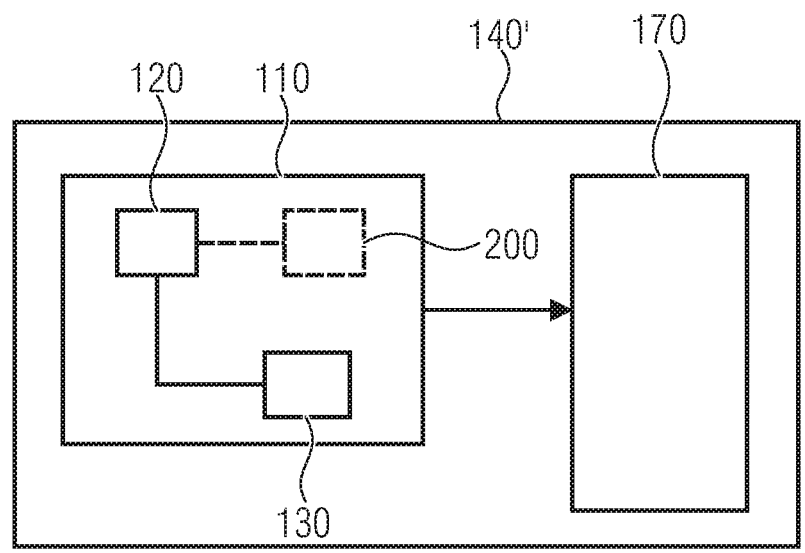
FIG. 2 is an illustration of an example of a 3D printer.

FIG. 2 shows an illustration of an example of a 3D printer 140'. The 3D printer 140' comprises the apparatus 110 as described herein and the print engine 170 connected to the apparatus 110. In the example shown in FIG. 2, apparatus 110 is integral with 3D printer 140'. Interface 200 may be a touchscreen of 3D printer 140'. In the example shown in FIG. 2, the 3D print job is generated by apparatus 110 within 3D printer 140' and is provided to print engine 170. In such examples, printer 140' may individually receive objects to be printed and may create the spatial arrangement and the 3D print job from the individually received objects.

In examples, the user interface is to permit the user to arrange the objects in a virtual build volume comprising different regions in a thickness direction of the virtual build volume, each region having associated therewith a specific build material layer thickness. By arranging the objects or object portions in a region having a specific build material layer thickness the user specifies the build material layer thickness for the object or object portion to be printed. Stating differently, by arranging the objects into a region or regions the user may determine which object portion has to be printed with which build material layer thickness. Thus, the user may control the layer thicknesses for the objects or object portions in an appropriate manner.

Figure 3:
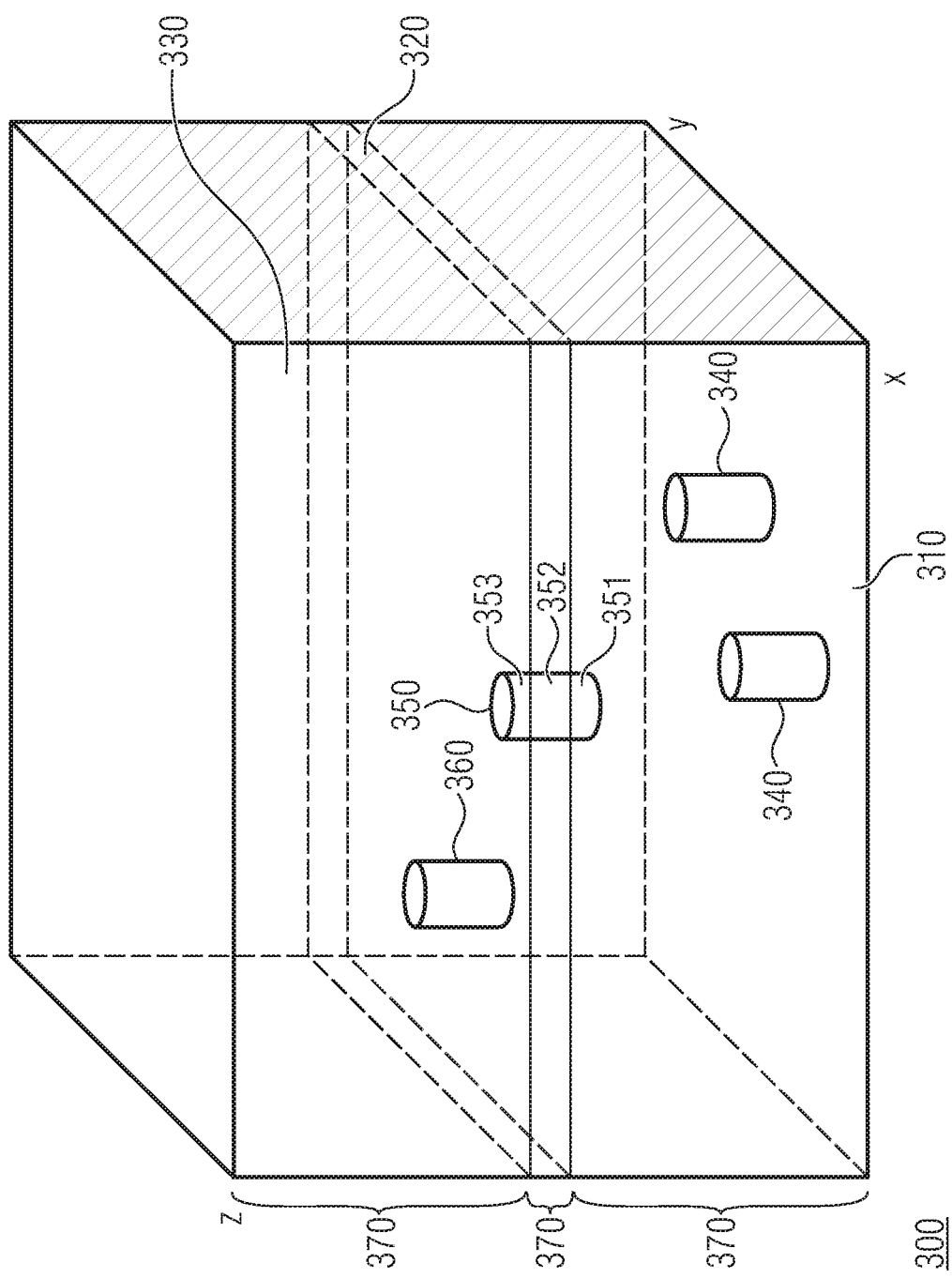
FIG. 3 is a perspective view of a virtual build volume in which objects or portions of the objects to be printed and associated with user-specified build material layer thicknesses are arranged according to an example.

The print engine 170 may comprise the build volume in which the objects are printed. A build unit comprising the build volume may be removable from the 3D printer or may be integral to the 3D printer. FIG. 3 shows an example of a build volume 300. Build volume 300 may represent a virtual build volume or may represent the real build volume. Build volume 300 is formed by a floor parallel to the xy-plane and a height in a z-direction perpendicular to the xy-plane. As shown in FIG. 3, the build volume 300 is divided into three regions in the z-direction, a first region 310, a second region 320 and a third region 330. The z-direction may also be referred to as the height direction or the thickness direction. Each of the three regions 310, 320 and 330 extends across the entire the build volume 300 in the x- and y-direction. The regions do not intersect each other. As shown in FIG. 3, each region has an associated region height or thickness 370.

Each region may have associated therewith a different build material layer thickness. For example, the first region 310 may have associated therewith a thickness t1, such as 120 µm, the second region 320 may have associated therewith a thickness t2, such as 100 µm, and the third region may have associated therewith a thickness t3, such as 80 µm.

In the build volume 300 shown in FIG. 3, there are arranged four objects; i.e. two first objects 340, a second object 350 and a third object 360. The first objects 340 are arranged in the first region 310. By arranging the first objects 340 in the first region, build material layer thickness t1 is associated with the first objects 340. The third object 360 is arranged in the third region 330 and, therefore, build material layer thickness t3 is associated with the third object 360. The second object 350 comprises a first object portion 351 arranged in the first region 310, a second object portion 352 arranged in the second region 352, and a third object portion 353 arranged in the third region. Thus, build material layer thickness t1 is associated with first object portion 351, build material layer thickness t2 is associated with second object portion 352, and build material layer thickness t3 is associated with third object portion 353. When printing the objects, each object or object portion is produced using the associated build material layer thickness.

Of course, the regions and thicknesses and the arrangement of the objects in the build volume in FIG. 3 are examples and the build volume may be divided into a different number of regions, the build material layer thicknesses may be different, and the objects may be arranged differently.

In examples the user interface is to permit the user to specify the different regions in the thickness direction of the virtual build volume and to define for each region the associated specific build material layer thickness. Specifying the regions may comprise dividing the virtual build volume into the different regions and defining the build material layer thicknesses associated with each region. Dividing the build volume into the different regions implies setting a thickness for each region and, thus, a number of build material layers fitting into each region. Thus, it may be controlled which build material layer thickness is to be used in which region or z-range of the build volume. In addition, by arranging the objects in respective regions, the user may specify the build material layer thickness with which each object or object portion is to be printed.

In examples, the interface may permit a user to directly input build material layer thicknesses for the objects. The machine-readable instructions may comprise instructions to cause the processor to divide the virtual build volume into a plurality of regions using the build material layer thicknesses input by the user. For example, the user may input the three different build material layer thicknesses for objects to be printed. In response, the processor may divide the build volume into three regions, one for each of the different thicknesses. The processor may then arrange the objects in the regions such that each object or object portion is arranged in a region and each object or object portion is printed using the build material layer thickness specified by the user. One region may be generated for a build material layer thickness specified by the user or more than one region may be generated for a build material layer thickness specified by the user.

Figure 4:
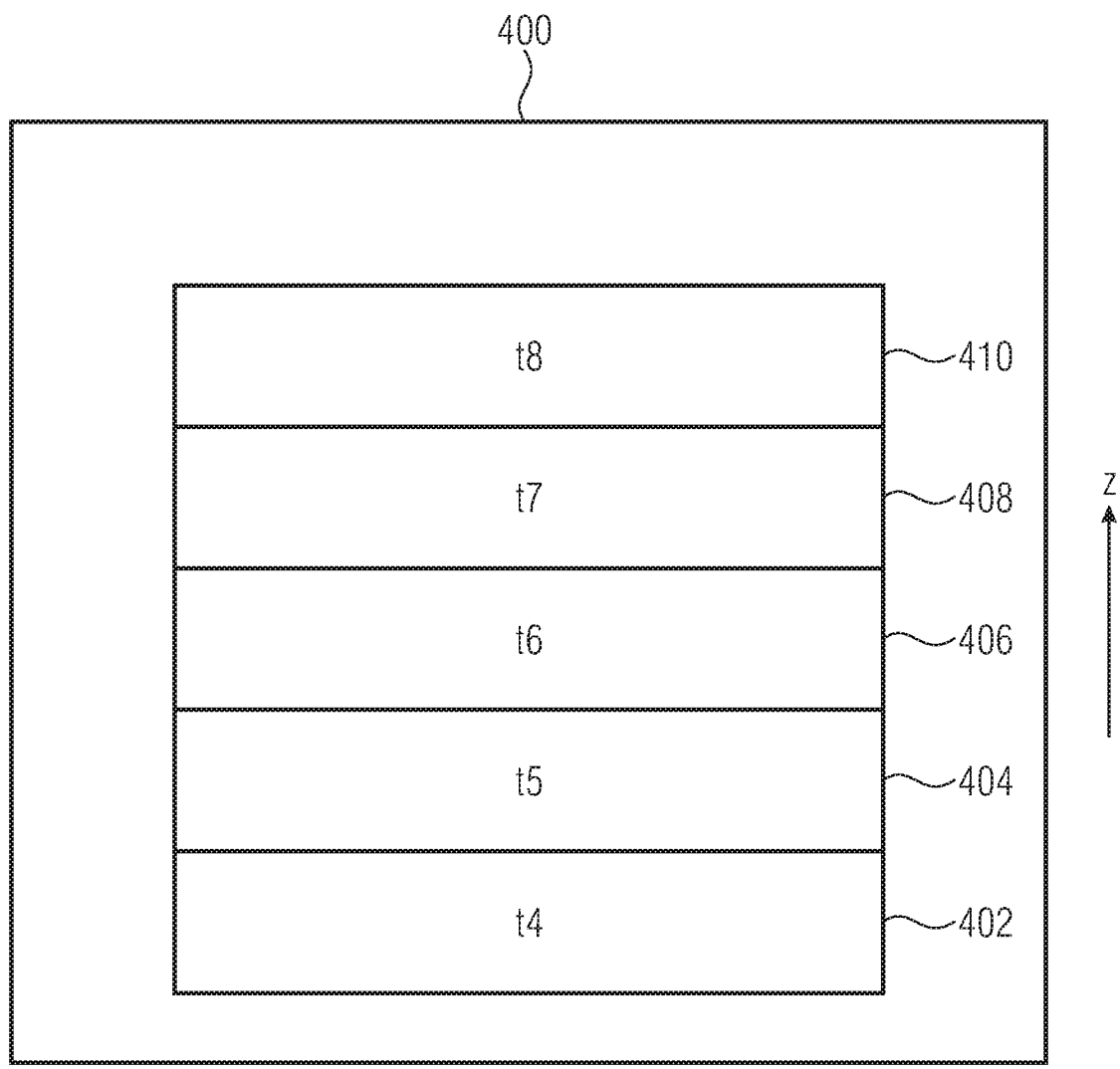
FIG. 4 is a schematic view of an example of a virtual build volume divided into five regions.

FIG. 4 shows a schematic view of an example of a build volume 400, which is divided into five regions 402, 404, 406, 408 and 410 along the thickness direction 410, i.e. along the z direction. Objects or object portions to be printed and associated with user-specified build material layer thicknesses may be arranged in the virtual build volume according to an example. In examples, the user interface may provide a presentation of the build volume, such as a 3D presentation as shown in FIG. 3 or a schematic view presentation as shown in FIG. 4. The user interface may allow a user to place objects and/or object portions to be printed in the build volume via the user interface. The user interface may present the build volume with a preset division into the different regions. The user interface may allow the user to modify the preset division, such as the number of regions and/or the size of the regions. In examples, the user interface may allow the user himself to divide the build volume into different regions as described above.

In the example shown in FIG. 4, build volume 400 is divided into five regions or ranges 402, 404, 406, 408 and 410 in the z direction. Each region 402, 404, 406, 408, 410 has associated therewith a specific build material layer thickness. Each region 402, 404, 406, 408 and 410 may have associated therewith a build material layer thickness that is different from the build material layer thickness of the adjacent region. While the regions are shown to have the same depth, i.e. extension in the z-direction, in FIG. 4, the regions may have different depths. Different regions may have associated therewith the same build material layer thickness. In an example, layer 402 may have associated therewith a build material layer thickness t4, layer 404 may have associated therewith a build material layer thickness t5, layer 406 may have associated therewith build a material layer thickness t6, layer 408 may have associated therewith a build material layer thickness t7, and layer 410 may have associated therewith a build material layer thickness t8. All thicknesses t4 to t8 may be different from each other. Some of the thicknesses may be the same. In an example, t4 may by 70 µm, t5 may be 120 µm, t6 may be 100 µm, t7 may be a default thickness, and t8 may be 70 µm. The default thickness may be 80 µm.

The machine-readable instructions cause processor 120 to generate a 3D print job defining the spatial arrangement of the objects to be printed. For each object or object portion, for which the user specified a build material layer thickness, the 3D print job defines the user-specified build material layer thickness. For objects or object portions, for which the user did not specify a build material layer thickness, a default build material layer thickness may be used. The 3D print job causes the print engine 170 to print each object upon submitting the 3D print job to the print engine 170. The 3D print job may comprise one build package file for every different build material layer thickness. In examples, the build package file may be a so-called 3MF file. Of course, any other suitable file format may be used.

Referring again to FIG. 4, the 3D print job may comprise a first build package file for thicknesses t4 and t8, a second build package file for thickness t5, a third build package file for thickness t6, and a fourth build package file for thickness t7. Thus, regions having associated therewith the same build material layer thickness, such as regions 402 and 402 may be combined in the same build package file.

User inputs to divide the build volume into regions having associated therewith specific build material layer thicknesses may be used to generate a printing profile. The printing profile may be used in creating the 3D print job. Printing profiles defining different regions of the build volume and the build material thicknesses associated with the different regions may be stored in a memory, such as memory 130. Such printing profiles may be default printing profiles or printing profiles generated using user inputs in preparation of earlier print jobs. A Printing profiles may be associated with a specific build material. A stored printing profile may be selected by a user in preparation of a new print job. Thus, the user's effort in preparing a new print job may be reduced by using stored printing profiles. Of course, the printing profiles may be amended according to the user's intention.

FIG. 5 shows code relating to examples of portions of printing profiles 510, 520 defining build material layer thicknesses. A first printing profile 510 called "PrintProfile-Fast" defines a single build material layer thickness defined in a variable 530. In this example the build material layer thickness has a value of 80 μm. A second printing profile 520 called "PrintProfileBalanced" defines different build material layer thicknesses. In this example, the printing profile 520 defines three different build material layer thicknesses as indicated by variables 540, 550 and 560. In the example shown, variable 540 indicates a thickness of 80 μm, variable 550 indicates a thickness of 70 μm and variable 560 indicates a thickness of 120 μm.

As explained above, creating the 3D print job may comprise generating a separate build package file, such as a 3MF file, for each different build material layer thickness. Each build package file relating to a user-specified build material layer thickness different from a default build material layer thickness may include an indicator indicating the associated build material layer thickness. A build package file relating to a default build material thickness may include an indicator to the default build material thickness or may not include any indicator at all. For any build package file not including such an indicator, the default build material thickness may be used automatically.

FIG. 6 shows code describing an example of a portion of a build package file including an indicator 610. In this example, indicator 610 indicates a build material layer thickness of 70 μm. The build package file of FIG. 6 may relate to regions 402 and 410 in FIG. 4, which have associated therewith a build material layer thickness of 70 μm. In a similar manner, separate build package files for region 404 with an indicator t5, for region 406 with an indicator t6 and for region 408 with an indicator t7 may be provided. In examples, to specify the build material layer thickness to be used for the print process, a 3MF metadata XML section from the so-called StartPart model may be used.

In examples, the machine-readable instructions cause the processor to generate a job ticket including a variable indicating a number of build package files the print job includes. In examples, the print job comprises the job ticket and the build package files. The printer or the print engine may use the variable indicating the number of build package files to verify whether all build package files have been received prior to starting the print job. FIG. 7 shows code relating to an example of a print job ticket. The print job ticket includes a variable 710, which, in this example, indicates that the print job contains five build package files. The 3D printer or the 3D print engine will await receiving all five build package files before it prior to starting the printing process. In addition, the print job ticket may specify a printing profile to be used or may include the printing profile.

Examples provide a 3D printing system 100 as shown in FIG. 1. The 3D printing system 110 comprises the 3D printer 140 and an apparatus 110 to create a print job as disclosed herein. The 3D printer 140 receives the print job and executes a build process as defined in the print job to print the objects or the object portions of the objects using the spatial arrangement and the build material thicknesses defined in the print job.

In examples of the 3D printing system, the 3D printer is to derive the number of build package files from the job ticket, to receive the number of build packages indicated in the job ticket and to start printing upon receiving the number of build package files indicated in the job ticket. Communication between apparatus 110 and the 3D printer 140 may be via a wired or wireless connection or a combination thereof. In examples, a web-based printing system using a web service may be used for the communication between the apparatus and the 3D printer. After receiving the number of build package files indicated in the print job ticket, the printer starts the printing process and prints the objects as defined in the print job in the build volume. Thus, the objects are printed using the build material thicknesses specified by the user in preparing the print job.

In examples, in executing the print job, the 3D print engine applies continuous layers of build material, applies a fusing agent to portions of the continuous layers of build material, and applies fusing energy to the continuous layers of build material so that the portions applied with fusing agent are fused. In other examples, the 3D printing engine may be to use other 3D printing techniques, such as binder jet techniques, selective laser sintering techniques and stereolithography techniques. The 3D objects are printed as defined in the print job. In doing so, the 3D printing engine may adjust the amount of fusing agent applied and/or the amount of fusing energy applied depending on the thickness of the respective continuous layer of build material. Thus, the printing process may be adapted to the user-specified build material layer thicknesses. In examples, the thicker the build material layer thickness is the more fusing agent and/or fusing energy is applied.

The build material may include powder. In examples, the build material includes short fibres that may have been cut into short lengths from long strands or threads of material. The build material may include plastics, ceramic, and metal powders and powdery materials. In examples, the 3D printer may use chemical binder systems or may use metal type 3D printing. The present disclosure is not limited to the specified 3D printing systems disclosed herein.

According to one example, a suitable fusing agent may be an ink-type formulation comprising carbon black, such as, for example, the fusing agent formulation commercially known as V1Q60A "HP fusing agent" available from HP Inc. In one example, such a fusing agent may additionally comprise an infra-red light absorber. In one example, such an ink may additionally comprise a near infra-red light absorber. In one example, such a fusing agent may additionally comprise a visible light absorber. In one example, such an ink may additionally comprise a UV light absorber. Examples of inks comprising visible light enhancers are dye based colored ink and pigment based colored ink, such as inks commercially known as CE039A and CE042A available from HP Inc. According to one example, a suitable de-tailing agent may be a formulation commercially known as V1Q61A "HP de-tailing agent" available from HP Inc. According to one example, a suitable build material may be PA12 build material commercially known as V1R10A "HP PA12" available from HP Inc.

Figure 8:
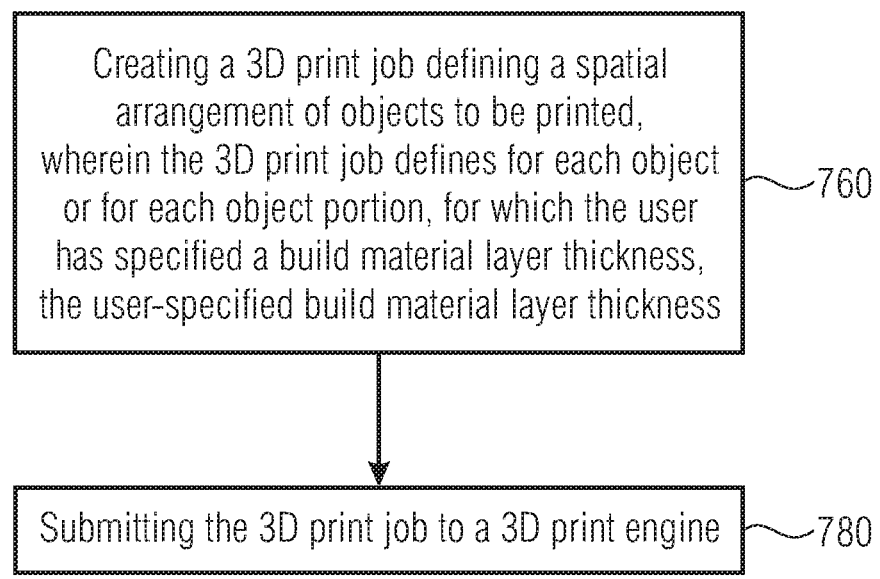
FIG. 8 is a flow diagram showing an example of a method according to the present disclosure.
Figure 9:
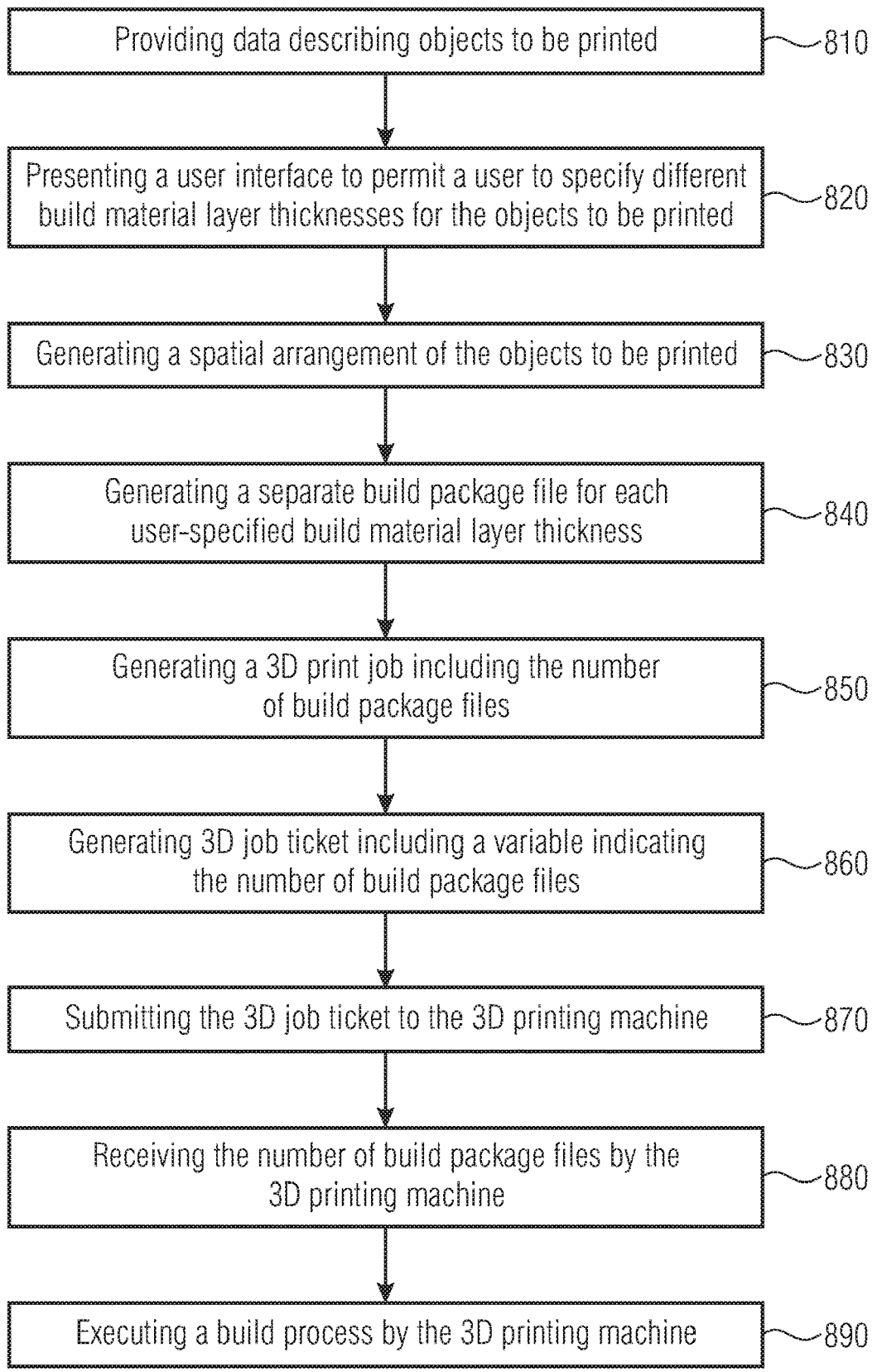
FIG. 9 is a flow diagram outlining a method of operating a 3D printing system according to an example.

Examples of the present disclosure provide a method to generate a print job, which permits a user to specify for objects or object portions to be printed in a single printing process different associated build material layer thicknesses. FIG. 8 shows an example of a method of creating a 3D print job and submitting it to a 3D print engine. At 800, a 3D print job is created. The 3D print job defines a spatial arrangement of objects to be printed such that each object or each object portion is arranged in a region or regions having a build material layer thickness corresponding to a user-specified build material layer thickness and such that objects or object portions having different build material layer thicknesses are arranged at different regions. The 3D print job defines for each object or for each object portion, for which a user has specified a build material layer thickness, the user-specified build material layer thickness. The method may further comprise submitting the 3D print job to a 3D printing engine. In examples, the method may comprise presenting a user interface to permit a user to specify for objects or object portions to be printed associated build material layer thicknesses, wherein different build material layer thicknesses may be specified for different objects or different object portions. In other examples, the method may comprise receiving objects with already defined layer thicknesses and creating the 3D print job using the received objects.

FIG. 8 shows a flow diagram of an example of a method 800 of 3D printing. At 810, data describing objects to be printed are provided. The data may be provided from an external application. The data may be provided using a user's input. For example, a user may provide data defining the geometry of objects to be printed. For example, the data may comprise information about an object height, and/or about an object form, and/or about an object material for printing the objects or other information that may be useful for printing the object or the objects. In another example, at 820, a user interface to permit a user to specify for objects or object portions to be printed associated build material layer thicknesses is presented. In different words, the user may define which object or object portion has to be printed with which user-specified build material thickness. The user may define different regions being allocated to different user-specified build material thicknesses. The user may arrange objects in regions having an associated build material thickness to thereby specify user-specified build material layer thicknesses of the objects or object portions to be printed. In other examples, objects with already defined layer thicknesses may be received.

At 830, a spatial arrangement of the objects or object portions to be printed is generated such that each object or each object portion is arranged in a region or regions having a build material layer thickness corresponding to the user-specified build material layer thickness and such that objects or object portions having different build material layer thicknesses are arranged at different regions. The arrangement may be generated automatically by a processor or may be supported by a user placing the objects in the arrangement such as using a user interface. At 840, for each user-specified build material layer thickness a separate build package file is generated. If the build volume is divided into a plurality of regions wherein two or more regions being located apart from each other but have allocated the same build material layer thickness, then the two or more regions may be combined in the same build package file.

At 850, a 3D print job including the number of build package files is generated. At 860, a print job ticket including a variable indicating the number of build package files is generated. At 870, the 3D job ticket is submitted to the 3D printing engine. The variable indicating the number of build package files enables the 3D printing engine to check that all build package files are received before starting the print process. Upon receiving all build package files at 880, executing the build process takes place at 890.

Examples provide a non-transitory machine-readable storage medium encoded with instructions executable by a processor. The instructions may cause the processor to present a user interface to permit a user to specify for objects or object portions to be printed associated build material layer thicknesses, wherein different build material layer thicknesses may be specified for different objects or different object portions. The instructions further cause the processor to create a 3D print job defining a spatial arrangement of the objects to be printed such that each object or each object portion is arranged in a region or regions having a build material layer thickness corresponding to the user-specified build material layer thickness and such that objects or object portions having different build material layer thicknesses are arranged at different regions. The 3D print job defines for each object or for each object portion, for which the user has specified a build material layer thickness, the user-specified build material layer thickness. The instructions may further cause the processor to submit the 3D print job to a 3D printing engine.

In examples, the non-transitory machine-readable storage medium may be encoded with instructions so that the methods or parts of the methods as described herein are performed and/or so that the functionalities or part of the functionalities of the hardware described herein are achieved.

In examples, the print job may be submitted to the printer using a "2 HTTP POST request" to a printer's web service. In a first request, a job ticket may be sent specifying job specific information, such as the job name or a selected printing profile. When the printer receives this request, it may validate the correctness of the job ticket and may generate a new uniform resource locator, URL, as a destination for the job content. Then, in a second request, a pre-print application may post the build package file, such as the 3MF file, to be printed. This build package file may be intended to be processed for being printed with a uniform layer thickness which is defined by the printing profile. Examples of the present disclosure permit submitting jobs with variable build material layer thickness. In examples, parts or objects are arranged such that parts to be printed in the same layer have the same layer thickness. Thus, powder disposition may be uniform across the xy-plane in the bed. In examples, the printing profile exposes a range of supported layer thicknesses rather than a single layer thickness.

The code shown in FIG. 5 may be an example of a response of a materials web service for a specific build material, and defines two printing profiles as explained above. The variable layer thickness may be specified by a minimum and a maximum value, which define the range of valid values, and a default value which may be used for jobs sent using a regular job submission, i.e. a job submission without user-specified build material layer thickness. In examples, a pre-print application may load these values and may offer a user to specify different ranges, i.e. regions, in the z-direction across the usable platform of the printer and to define a different layer thickness for every range. The user may then select which parts are to be produced in which range so that the parts will be produced using the set layer thickness. Once the user has finished adding the parts, the user may initiate submitting the print job to the printer, such as by clicking a submission button. Thereupon, the pre-print application may generate the print job by generating one isolated build material file, i.e. 3MF job, for every one of the ranges which are intended to be printed with a different layer thickness. There is not any overlapping of parts between the parts belonging to different build material files.

In examples, submission of the print job may comprise one HTTP POST request for submitting the job, wherein the job ticket may specify that the number of build packages will be greater than and equal to the z-ranges defined or equal to the number of different build material layer thicknesses. As explained above, two isolated z-ranges using the same build material layer thickness may be packed in the same build material file as long as all objects or parts in the same build material file will be printed with the same layer thickness. For example, in the example shown in FIG. 4, ranges 402 and 410 may be encoded in the same build material file.

In examples, after the ticket is accepted, the printer will wait for as many HTTP POST requests of build material files as the number indicated in the job ticket. Then, the printer may start submitting each build material file to its print engine. In case of 3MF files, for specifying the layer thickness to be used for printing each of the build material files, the pre-print application may use the 3MF metadata XML section from the StartPart model. If the layer thickness to be used is the same as the default one, no layer thickness has to be specified at all. The printer may process each build material file with the indicated layer thickness. Once all build material files belonging to a variable layer thickness job are received and processed, the job may be ready to be printed using the variable layer thickness profile.

Examples of the present disclosure allow a user to print, under the same job, parts with different layer thickness. Examples allow the user to reduce the time to print the complete job by increasing the layer thickness for certain parts for which part quality is not that relevant. Examples allow the user to print within the same job parts which are to be printed with better quality, limiting thus the increase in printing time. Examples fit under the current Web Service API definition and may be implemented without major changes.

Examples described herein may be realized in the form of hardware, machine-readable instructions or a combination of hardware and machine-readable instructions. Any such machine-readable instructions may be stored in the form of volatile or non-volatile storage such as, for example, a storage device, such as a ROM, whether erasable or rewritable or not, or in the form of memory, such as, for example, RAM, memory chips, device or integrated circuits or an optically or magnetically readable medium, such as, for example, a CD, DVD, magnetic disk or magnetic tape. The above storage devices and storage media are examples storage medium 130 and are examples of machine-readable storage, that are suitable for storing a program or programs that, when executed, implement examples described herein.

In examples, any hardware described herein, in particular the processor, may include circuitry in a controller, a microprocessor, or an application specific integrated circuit, ASIC, or may be implemented with discrete logic or components, or a combination of other types of analog or digital circuitry, combined on a single integrated circuit or distributed among multiple integrated circuits. A product, such as a computer program product, may include a storage medium and computer readable instructions stored on the medium, which when executed in a computer system, a printer or other device, cause the device to perform operations according to any of the description above.

The processing capability of the systems, devices, and circuitry described herein, including the processor 120 or any portion thereof, may be distributed among multiple system components, such as among multiple processors and memories, which may include multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and applications may be parts, such as subroutines of a single program, separate programs, distributed across several memories and processors, or implemented in many different ways, such as in a library, such as a shared library, such as a dynamic link library, DLL. The DLL, for example, may store code that performs any of the system processing described above. While various examples have been described above, many more implementations are possible.

All of the features disclosed in the specification including any accompanying claims, abstract and drawings, and/or all the features of any method or progress described may be combined in any combination including any claim combination, except combinations where at least some of such features are mutually exclusive. In addition, features disclosed in connection with a system may, at the same time, present features of a corresponding method, and vice versa.

Each feature disclosed in the specification including any accompanying claims, abstract and drawings may be replaced by other features serving the same, equivalent or a similar purpose, unless expressly stated otherwise. Thus, unless expressly stated otherwise, each feature disclosed is one example of a generic series of equivalent or similar features.

The foregoing has described the principles, examples and modes of operation. However, the teachings herein are not be construed as being limited to the particular examples described. The above-described examples are to be regarded as illustrative rather than restrictive, and it is to be appreciated that variations may be made in those examples by workers skilled in the art without departing from the scope of the following claims.

The invention claimed is:

1. An apparatus comprising:
a processor;
a non-transitory machine-readable storage medium storing instructions executable on the processor to:
present a user interface to receive a user specification of different build material layer thicknesses for different objects or different object portions to be printed;
divide a virtual build volume into a plurality of regions using the build material layer thicknesses specified by the user specification;
create a three-dimensional (3D) print job defining a spatial arrangement of the different objects or the different object portions to be printed, the spatial arrangement comprising an arrangement of the different objects or the different object portions in the plurality of regions, wherein a first object or first object portion associated with a first build material layer thickness is arranged in a first region of the plurality of regions, and a second object or second object portion associated with a different second build material layer thickness is arranged in a different second region of the plurality of regions; and
submit the 3D print job to a print engine to print the different objects.

2. The apparatus of claim 1, wherein the arrangement of the different objects or the different object portions in the plurality of regions of the virtual build volume is specified in the user interface.

3. The apparatus of claim 1, wherein the plurality of regions extend in a thickness direction of the virtual build volume.

4. The apparatus of claim 3, wherein a region of the plurality of regions is associated with a respective build material layer thickness that is different from a build material layer thickness associated with another region of the plurality of regions.

5. The apparatus of claim 1, wherein a given object of the different objects has a first object portion and a second object portion, and wherein the spatial arrangement places the first object portion of the given object in the first region, and the second object portion of the given object in the second region.

6. The apparatus of claim 5, wherein the 3D print job specifies that the first object portion of the given object is to be built with the first build material layer thickness, and the second object portion of the given object is to be built with the second build material layer thickness.

7. The apparatus of claim 1, wherein creating the 3D print job comprises:
creating a separate build package file for each respective build material layer thickness of the different build material layer thicknesses.

8. The apparatus of claim 7, wherein creating the 3D print job comprises generating a job ticket including a variable indicating a number of build package files the 3D print job includes.

9. The apparatus of claim 7, wherein the build package file for the first build material layer thickness comprises an indicator indicating the first build material layer thickness.

10. The apparatus of claim 9, wherein the first build material layer thickness is different from a default build material layer thickness.

11. A three-dimensional (3D) printer comprising:
an apparatus and a 3D print engine;
the apparatus comprising a processor and a non-transitory machine-readable storage medium storing instructions executable on the processor to:
present a user interface to receive a user specification of different build material layer thicknesses for different objects or different object portions to be printed;
create a 3D print job defining a spatial arrangement of the different objects or the different object portions to be printed, the spatial arrangement comprising an arrangement of the different objects or the different object portions in a plurality of regions, wherein a first object or first object portion associated with a first build material layer thickness is arranged in a first region of the plurality of regions, and a second object or second object portion associated with a different second build material layer thickness is arranged in a different second region of the plurality of regions,
wherein the creating of the 3D print job comprises:
creating a separate build package files for respective build material layer thicknesses of the different build material layer thicknesses in the user specification, wherein a build package file for a corresponding build material layer thickness includes an indicator indicating the corresponding build material layer thickness, and
creating a job ticket including a variable indicating a number of build package files the 3D print job includes; and
submit the 3D print job to the 3D print engine; and
wherein the 3D print engine is to receive the 3D print job and to print the different objects according to the spatial arrangement defined in the 3D print job.

12. The 3D printer of claim 11, wherein the arrangement of the different objects or the different object portions in the plurality of regions is specified in the user interface.

13. The 3D printer of claim 11, wherein each build package file for an associated build material layer thickness different from a default build material layer thickness includes an indicator indicating the associated build material layer thickness.

14. The 3D printer of claim 11, wherein the 3D print engine is to derive the number of build package files from the job ticket using the variable.

15. The 3D printer of claim 11, wherein the 3D print engine is to:
apply build material layers having the different build material layer thicknesses, and
apply energy to the build material layers so that portions of the build material layers are solidified.

16. The 3D printer of claim 15, wherein the 3D print engine is to:
apply a fusing agent to the portions to be solidified, and
adjust an amount of fusing energy applied to a given build material layer dependent on the respective build material layer thickness of the given build material layer.

17. A method comprising:
presenting a user interface to receive a user specification of different build material layer thicknesses for different objects or different object portions to be printed;
dividing, by a system comprising a hardware processor, a virtual build volume into a plurality of regions using the build material layer thicknesses specified by the user specification;
creating, by the system, a three-dimensional (3D) print job defining a spatial arrangement of the different objects or the different object portions to be printed, the spatial arrangement comprising an arrangement of the different objects or the different object portions in the plurality of regions, wherein a first object or first object portion associated with a first build material layer thickness is arranged in a first region of the plurality of regions, and a second object or second object portion associated with a different second build material layer thickness is arranged in a different second region of the plurality of regions; and
submitting the 3D print job to a print engine to print the different objects.

18. The method of claim 17, wherein creating the 3D print job comprises:
creating a separate build package file for each respective build material layer thickness of the different build material layer thicknesses.

19. The method of claim 18, wherein the build package file for the first build material layer thickness comprises an indicator indicating the first build material layer thickness.

20. The method of claim 18, wherein creating the 3D print job comprise providing, to the print engine, a variable indicating a number of build package files the 3D print job includes.

* * * * *